United States Patent [19]

Murray

[11] 4,300,865
[45] Nov. 17, 1981

[54] BLIND CLIP FASTENER
[75] Inventor: Ronald A. Murray, Methuen, Mass.
[73] Assignee: TRW Inc., Cleveland, Ohio
[21] Appl. No.: 56,575
[22] Filed: Jul. 11, 1979
[51] Int. Cl.$^3$ .......................... F16B 39/28; H01R 4/56
[52] U.S. Cl. .................................. 411/15; 339/217 S;
  411/175; 411/523; 411/527
[58] Field of Search ........................ 85/80; 151/41.75;
  24/73 BC, 73 MF, 81 BM; 339/217 S

[56] References Cited
U.S. PATENT DOCUMENTS

| | | | |
|---|---|---|---|
| 2,180,925 | 11/1939 | Dyresen | 24/73 MF X |
| 2,188,026 | 1/1940 | Wiley | 24/73 MF |
| 2,246,720 | 6/1941 | Churchill | 24/81 BM X |
| 2,885,754 | 5/1959 | Munse | 24/73 MF X |
| 2,930,090 | 3/1960 | Brown et al. | 24/73 BC |
| 3,340,497 | 9/1967 | Balint | 339/217 S |
| 3,421,135 | 1/1969 | Soltysik et al. | 339/217 S |
| 3,486,158 | 12/1969 | Soltysik et al. | 339/14 L |
| 3,486,202 | 12/1969 | Nelson | 24/73 MF |
| 3,525,285 | 8/1970 | Van Niel et al. | 151/41.75 X |
| 3,795,890 | 3/1974 | Van Buren | 339/14 R X |

Primary Examiner—Thomas J. Holko
Attorney, Agent, or Firm—James R. O'Connor; Thomas C. O'Konski; John F. McKenna

[57] ABSTRACT

A blind spring clip fastener for insertion in a round hole in a work piece has a head portion and a shank portion extending perpendicular to the head portion. The shank portion comprises a pair of spaced-apart mirror image sections extending from opposite side edges of the head portion, each section including a resilient leg and a pair of wings integral with the free ends of the leg and extending toward the head portion at opposite side edges of the leg. Each wing is shaped so that it has a side edge extending upwardly-outwardly beyond the plane of its leg and a free end extending from a point beyond the plane of the associated leg relatively steeply upwardly-inwardly toward the head portion.

6 Claims, 5 Drawing Figures

BLIND CLIP FASTENER

This invention relates to a blind fastener. It relates more particularly to a fastener of the snap mounted clip variety for connecting one work piece to another.

BACKGROUND OF THE INVENTION

The clip fasteners of the general type with which we are concerned here are often used to attach moldings, trim pieces or other such components to panels and other such members. They are also used to secure connecting terminals to work pieces of one kind or another. In many cases, the fasteners are formed with retaining tabs or lugs which are sheared from spring-like legs so that when the fastener legs are received in a work piece opening, the tabs resiliently engage the edges of the opening to retain the fastener in place. A screw extending through a second work piece is turned down through an aperture in the fastener to mechanically connect the two work pieces. Such fasteners are described, for example, in U.S. Pat. Nos. 3,486,158 and 3,795,890.

Heretofore, clip fasteners of this general type have been intended for securement to relatively rigid work pieces or members made of metal, stiff plastic or other hard material. Furthermore, in order to prevent the fastener from turning relative to the work piece, the work piece opening receiving the fastener is made rectangular or given some other irregular shape or the fastener and work piece are provided with abutting shoulders. However, of late, fastener-receiving work pieces made of softer materials such as fiberglass mat sheet molded compounds or so-called SMC materials have come into widespread use particularly in the automotive and boating industries. For example, automobile instrument panels and dashboards as well as boat hulls are fabricated of such materials.

When molding members of this sheet molded mat material, there is relatively poor control over the thickness of the finished parts. Furthermore, when fastener openings are formed in the parts, it has been found that the molds do not core all of the openings completely. Therefore, when the time comes to install fasteners in such openings, the operator often has to take time to remove uncored material from those holes before he can install the fasteners. With this in mind, it can be appreciated that if the opening is round, a standard drill and bit can be used to perform that operation very quickly. On the other hand, if the holes are not round, a special tool must be employed to cut or saw the excess material from each hole. Needless to say, that is a much more time-consuming task than a simple drilling operation. Therefore, prior fasteners such as the ones disclosed in the above named patents are not particularly suited for installation in sheet-molded fiberglass automotive or boating parts of the type described here.

Further it should be appreciated that when the fastener receiving holes in such parts are finish-formed by hand by different operators, there is bound to be some variance in the size of the holes. Therefore, it is essential that the fasteners installed in such parts be capable of tolerating some variation in the size of the opening in which it seats as well as in the thickness of the part itself.

Finally, many prior snap fasteners of this general type utilize a relatively large amount of material and they may require several different stamping operations in order to form them. Considering the very large numbers of such fasteners that are used in industry today, it would be highly desirable from a cost standpoint to provide such a fastener which can be fabricated in a few steps using a minimum amount of material.

SUMMARY OF THE INVENTION

Accordingly, it is an object of the present invention to provide an improved snap mounted clip fastener.

Another object of the invention is to provide a fastener of this type which is particularly suitable for securement to members made of relatively soft material such as sheet molded fiberglass compounds.

Another object of the invention is to provide a clip fastener for anchoring in a round hole.

Still another object of the invention is to provide such a fastener which resists turning when seated in a round hole.

A further object of the invention is to provide such a fastener which can tolerate dimensional variations in the hole in which it is seated.

A further object of the invention is to provide a blind clip fastener which is relatively easy and inexpensive to manufacture.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

Briefly, the present fastener is intended for use particularly in work pieces and other parts made of fiberglass mat sheet molded compounds, such as automotive instrument panels, boat hulls and other such structural parts. Furthermore, for the economic reasons discussed above, my fastener is designed especially to seat in a round hold and, when seated, resists pulling out of the hole and resists turning when a second part is secured to the fastener by a screw turned down into an aperture in the fastener.

The fastener itself comprises a simple unitary stamped metal part having a head portion formed with a screw-receiving aperture and a shank composed of a pair of opposed relatively narrow resilient legs extending perpendicularly from opposite marginal edges of the head portion. A pair of wings integral with the lower end of each leg extend along opposite side edges of that leg toward the head portion. The corresponding wings on each leg are bent toward one another about the longitudinal centerline of the fastener.

Also the ends of the legs to which the wings are attached are toed inward toward one another which orientation cocks each pair of wings relative to the remainder of that leg whereby the upper end segments of the wing pair project outward beyond the plane of that leg. More particularly, a side edge of each wing in the pair extends upwardly-outwardly relative to the leg. Also an upper free end of each wing extends upwardly-inwardly at a relatively steep angle back toward the plane of the leg so that it is disposed proximate to, but spaced from, the plane of the head portion just outboard of the leg. At the boundary between the aforesaid side edge and upper end of each wing is a pronounced upwardly-outwardly extending prong which facilitates proper insertion of the fastener into a work piece and inhibits its removal therefrom as will be described in detail later.

When the fastener is inserted into a properly sized round opening in a work piece, the side edges of the wings wedge against the edge of the opening thereby springing the legs together. As the head portion of the fastener bottoms against the opposing surface of the work piece, the prongs on the wings eventually clear the opening with the result that the resilient legs snap back toward their normal unstressed positions so that the sharp, upper free ends of the wings slice or cut into the edge of the opening at spaced-apart locations around the opening. These wing ends are relatively long so that they cut into and firmly engage the edge of the openings even though the size of that opening and/or the thickness of the work piece may not be quite standard.

The prongs projecting from the wings thus cause the legs to deflect toward one another to a maximum degree so that the legs snap back with appreciable force thereby driving the wing ends relatively deeply into the edge of the opening. Furthermore, when the fastener is seated, those prongs are positioned right at the undersurface of the work piece so that if a force is exerted on the fastener tending to pull it out of its opening, the prongs bite into the undersurface of the part and inhibit such removal. It should be understood, however, that the slicing engagements between the steeply angled, upper free ends of the wings and the opening edge are the prime factors that securely retain the fastener in the work piece. They not only resist removal of the fastener; they also prevent rotation of the fastener in either direction despite the fact that it is installed in a round hole.

It is also important to note that this rotative securement of the fastener in its hole occurs before a screw is turned down into the aperture in the head portion. Obviously, if such rotation occurred, it would be practically impossible to tighten the screw into the fastener or to remove it therefrom, particularly when, as is often the case, one cannot obtain access to the undersurface of the part in which the fastener is installed in order to grip the fastener.

The fastener is stamped from a single metal piece having a relatively small overall area so that a minimum amount of material is required to make it. Furthermore the finished fastener is formed using only a few cutting and stamping steps. Therefore, its overall manufacturing cost is relatively small. Finally, the fastener can be installed in various work pieces and parts without any special tools or equipment resulting in further cost savings, particularly when the clip is installed in parts made of relatively soft sheet molded fiberglass mat compounds which oftentimes require that the fastener holes be finished by hand as described above.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figure 2:
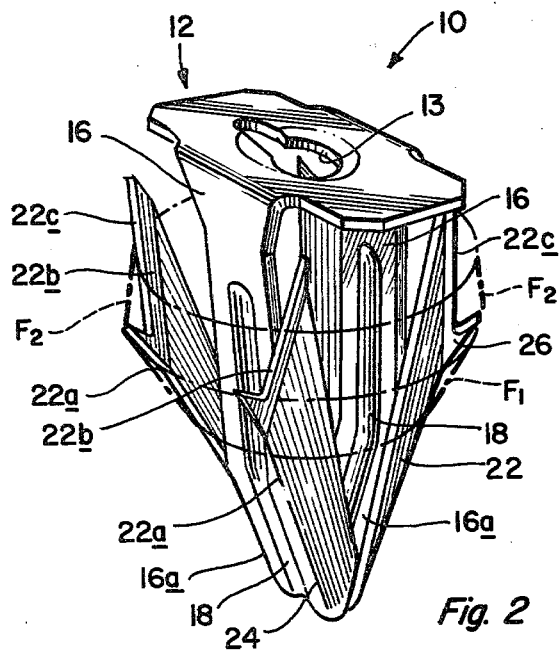
FIG. 2 is a perspective view on a larger scale showing the fastener in greater detail.
Figure 3:
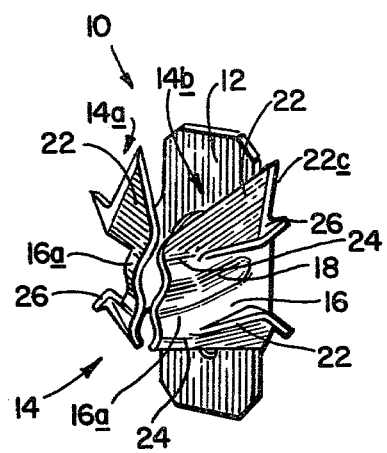
FIG. 3 is a similar view on a slightly smaller scale taken from a different perspective.
Figure 4:
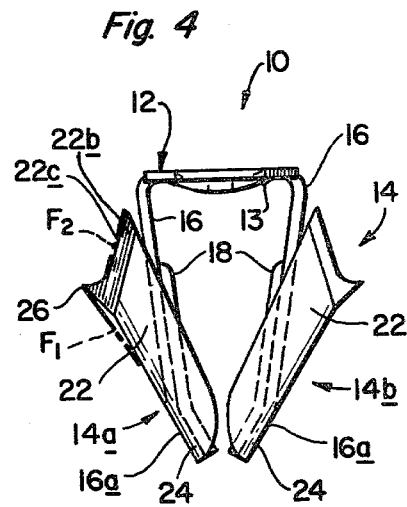
FIG. 4 is a side elevational view of the fastener.

Referring first to FIGS. 2 to 4 of the drawing, the fastener made in accordance with this invention is indicated generally at 10. It comprises a generally rectangular head portion 12 formed with a centrally located screw-receiving aperture 13. The fastener shank, shown generally at 14, extends generally perpendicular to the plane of the head portion. It comprises a pair of mirror image shank sections 14a and 14b disposed about the longitudinal axis of the fastener. Each section includes a leg 16 bent down from a side edge of head portion 12 so that the leg extends generally parallel to the longitudinal axis of the fastener. Also, each leg is formed with a lengthwise crease or corrugation 18 extending midway between the side edges of the leg from a point near the top of the leg all the way to the bottom thereof which serves to stiffen the leg.

A pair of wings 22 joined to an end segment 16a of each leg along opposite side edge boundaries 24 project toward head portion 12. The wings on each leg are bent toward the corresponding wings on the opposite leg along their boundary lines 24 with their respective leg end segments. In addition, the lower leg segments 16a are toed inward toward one another thereby cocking the wings on each leg so that their side edges 22a above the boundary lines 24 and closest to the associated leg extend upwardly-outwardly beyond the plane of that leg 16 forming acute angles with that plane. Also the upper free end 22b of each wing 22 is relatively steeply angled upwardly-inwardly back toward the plane of the associated leg 16 so that it also makes an acute angle with the plane of that leg. Furthermore, the upper end 22b of each wing 16 is upset or bent laterally away from its leg so that it presents a relatively sharp edge 22c to the head portion. Formed at the corner between the edges 22a and 22c of each wing is a sharp upwardly-outwardly extending tang or prong 26 which is more or less an extension of edge 22a.

As shown in dotted lines in FIGS. 2 and 4, the side edges 22a, including the prongs 26, of the four wings 22 together define a generally frustoconical surface of revolution F1 having its maximum diameter at the tips of the prongs. In addition, the upper free ends 22b of the wings define a second frustoconical surface of revolution F2 having its maximum diameter adjacent prongs 26. In other words, the two surfaces F1 and F2 have opposite senses. These orientations of the various wing edges facilitate the insertion and retention of the fastener in a round work piece opening as will be described presently.

Figure 1:
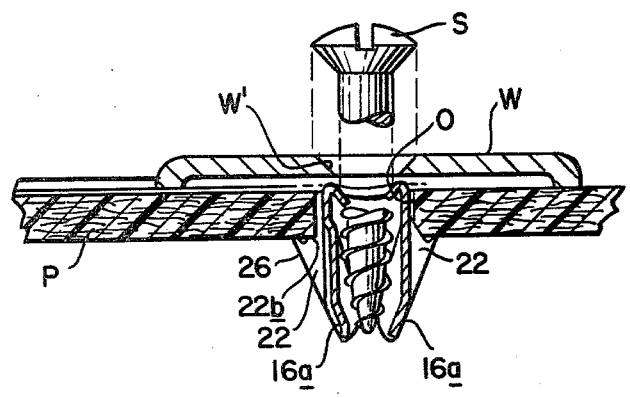
FIG. 1 is a sectional view with parts in elevation showing two work pieces connected by a fastener made in accordance with this invention.

Refer now to FIG. 1 which illustrates the fastener 10 used to secure a work piece W in the form of a length of trim molding to a part P which may be an automotive instrument panel made of a sheet molded fiberglass compound. The fastener 10 is inserted shank 14 first into a properly sized round opening O in part P. As the fastener is pushed into the opening, the leg end segments 16a pass relatively freely through the opening. However, the wing edges 22a defining surface F1 wedge against the edge of opening O, thereby springing together the resilient shank legs 16. As the sides of prongs 26 are forced through opening O, the legs are compressed together even more so that they possess a considerable amount of potential energy. As soon as the tips of the prongs 26 clear the edge of opening O at the underside of part P, that energy is released causing the legs to spring back immediately toward their unstressed positions. Whereupon the wing ends 22b are driven forcefully against the edge of the opening so that their sharp edges 22c actually slice or bite into that edge at or near the undersurface of that part P as shown in FIG. 1. Thus the surface F2 defined by those edges actually intercepts the part P radially outward from opening O.

The lengths of the cutting edges 22c are fairly long. Also the distances through which the legs 16 spring upon insertion of the fastener are such that even though the size of opening O or the thickness of the part P may vary to some extent, the wing ends 22b still anchor themselves relatively deeply in the edge of the opening.

Also because the upset wing edges 22c associated with each leg 16 are bent away from one another as best seen in FIG. 2, they slice or bite into the opening edge at oppositely directed angles. Consequently, they are very effective in preventing rotation of the fastener within the opening O in either direction about the longitudinal axis of the fastener. This means that once the fastener is properly seated in part P and even before a screw is turned down into the fastener aperture 13, the fastener is not only resistant to axial removal from the opening but also to rotations within the opening. Therefore when, as shown in FIG. 1, a work piece W is placed in position on part P with a screw opening W' in register with aperture 13 and a screw S projecting through opening W' is turned down into the fastener, there is very little likelihood of the fastener rotating within opening O so that the screw cannot be tightened properly. By the same token if it is necessary to remove screw S from the fastener 10 in order to repair or replace work piece W, that can be done without having to gain access to the underside of part P in order to manually prevent the fastener from rotating within opening O.

Of course when a relatively long screw S is used whose end pushes apart the toed-in lower ends of the clip legs 16, that causes the free ends of the wings to cut even further into the edges of the opening O so that the clip is even more firmly anchored in the part P.

Although the sharp wing edges 22c sprung against the edge of opening O are the prime factors preventing rotation and removal of the fastener, the prongs 26 also help in that respect. More particularly, as shown in FIG. 1, when the fastener is seated in part P, the prongs 26 engage the underside of part P adjacent the edge of opening O. Consequently any force tending to pull the fastener out of the part causes the prongs 26 to bite into the underside of the part and resist such dislodgement. Thus the prongs have a two-fold function, to wit: they enhance the biting engagement of the wing edges 22c with the edge of the opening by increasing the snap action of the legs 16 and they help to prevent the seated fastener from being pulled out of the opening.

Figure 5:
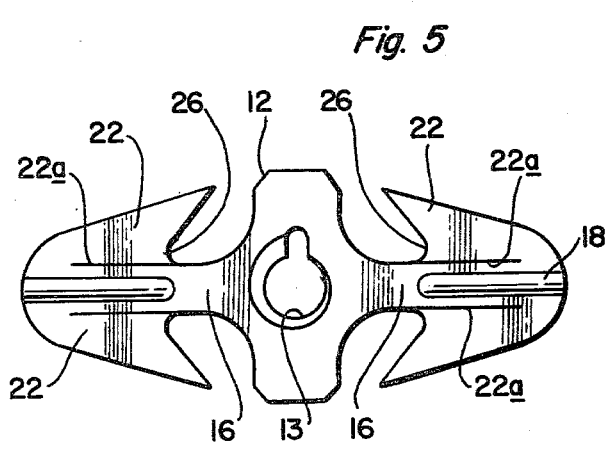
FIG. 5 is a top plan view of the blank from which the FIG. 2 fastener is formed.

The fastener 10 is made of sheet metal, preferably a relatively high carbon steel and formed from the single flat blank illustrated in FIG. 5. The various parts of the blank are numbered in accordance with their counterparts in FIG. 2. Basically, the blank comprises a generally rectangular center section 12 containing an aperture 13. Projecting from the opposite sides of section 12 are a pair of mirror image sections shaped like blunted arrows pointing away from section 12. Each arrow-shaped section is partially sheared lengthwise at a pair of spaced-apart locations indicated at 22a. These shear lines divide each such section into a straight leg or shaft 16 and a pair of generally triangular wings or blades 22. The trailing edges of the blades are swept back to form barbs at the corners of the arrow-shaped section facing section 12. Also the end segment of each arrow-shaped section is formed with a lengthwise crease 18 having its longitudinal axis aligned with the center of aperture 13. Using a few simple bending and forming operations, the FIG. 5 blank is transformed easily into the fastener 10 illustrated in FIGS. 2 to 4.

While we have described the subject fastener in terms of its utility as an anchor in a fiberglass work piece or part, it should be understood that it also can be seated in a round opening in a metal or rigid plastic part to secure a work piece to that part and achieve the same advantages described above. When made of a conductive metal, it can also be used as a terminal clip to removably attach a lead to a metal part such as a chassis or ground plate. It should also be understood that certain changes may be made in the above construction without departing from the scope of the invention. Therefore, it is intended that all matter contained in the above description or shown in the accompanying drawing should be interpreted as illustrative and not in a limiting sense.

It should also be understood that the following claims are intended to cover all of the generic and specific features of the invention herein described.

What is claimed as new and desired to be secured by Letters Patent of the United States is:

1. A blind clip fastener comprising
   A. an apertured head portion, and
   B. a shank portion integral with and extending generally perpendicular to the head portion, said shank portion comprising a pair of mirror image sections extending from opposite side edges of the head portion, each shank section including
      (1) a resilient leg, and
      (2) a pair of wings integral with the free end of each leg and extending toward the head portion at opposite side edges of that leg, each wing having opposite side edges and a free end, the wings associated with one leg being bent about their boundaries with that leg toward the corresponding wings on the other leg so that said wings lie in a plane which is substantially perpendicular to a plane in which said associated leg lies, and the wings associated with each leg also being shaped so that their side edges closest to that leg are inclined upwardly-outwardly beyond the plane of the associated leg and their free ends extend from points beyond the plane of the associated leg relatively steeply upwardly-inwardly toward the head portion.

2. The fastener defined in claim 1 and further including an upwardly-outwardly projecting prong formed at the corner between the closest side edge and free end of each wing.

3. The fastener defined in claim 1 wherein the free ends of said legs are toed inward toward one another.

4. The fastener defined in claim 1 wherein the wings on each leg have their free ends upset or bent away from one another so as to present to said head portion relatively sharp edges at said free ends.

5. The fastener defined in claim 1 wherein each leg is formed with a longitudinal crease for stiffening the leg.

6. A blind clip fastener comprising
   A. an apertured head portion, and

B. A shank portion integral with, and extending generally perpendicular to, the head portion, said shank portion comprising a pair of mirror image sections extending from opposite side edges of the head portion, each said shank section including
  (1) a resilient leg having a free end which is toed inwardly toward the longitudinal axis of the shank portion,
  (2) a pair of wings integral with the free end of each leg and extending toward the head portion at the opposite side edges of that leg, each wing having a side edge adjacent to its associated leg and a free end proximate to but spaced from the head portion, each wing being bent along its side edge with its associated leg toward a corresponding wing on the other leg so that each of said wings lies in a plane which is substantially perpendicular to the plane in which its associated leg lies, said wings being shaped and oriented with respect to the longitudinal axis of the shank portion so that said adjacent side edges of the wings together define a first frustoconical surface of revolution outboard of the planes of said legs with the smaller end of said first frustoconical surface facing the free ends of the legs, and so that the free ends of the wings together define a second frustoconical surface of revolution outboard of the planes of said legs with the smaller end of said frustoconical surface facing the head portion, the larger ends of said frustoconical surfaces more or less coinciding intermediate the opposite ends of the legs, and
  (3) prongs on said wings where said wings intercept the coinciding ends of said frustoconical surfaces, said prongs extending away from said axis and toward the plane of the head portion.

* * * * *